United States Patent [19]
Fantl et al.

[11] 3,960,485
[45] June 1, 1976

[54] PROCESS FOR RECOVERY AND REUSE OF TEXTILE SIZE

[75] Inventors: Joel Fantl, Springfield; Joseph G. Martins, Ludlow, both of Mass.

[73] Assignee: Monsanto Company, St. Louis, Mo.

[22] Filed: June 19, 1974

[21] Appl. No.: 480,670

[52] U.S. Cl. .................................. 8/138; 8/139; 210/51; 428/262
[51] Int. Cl.² .................. B01D 23/00; D06L 1/14; D06L 1/16
[58] Field of Search .............................. 8/138, 139; 117/139.5 A; 210/51; 428/262

[56] References Cited
UNITED STATES PATENTS

| | | | |
|---|---|---|---|
| 3,472,825 | 10/1969 | Walter et al. | 260/88.1 |
| 3,723,381 | 3/1973 | Corey et al. | 117/139.5 A |

FOREIGN PATENTS OR APPLICATIONS

| | | | |
|---|---|---|---|
| 785,232 | 10/1957 | United Kingdom | 8/138 |

*Primary Examiner*—Allan Lieberman
*Attorney, Agent, or Firm*—R. B. Blance; E. P. Grattan; J. C. Logomasini

[57] ABSTRACT

Warp textile sizes comprising interpolymers of vinyl esters are recovered by extraction of the interpolymer from woven cloth with an aqueous solvent to form an aqueous solution of the interpolymer. The interpolymmer is precipitated from the aqueous solution by adjusting the alkali metal ion concentration of the solution within defined limits and adding acid to reduce the pH to the range of 1 to 3. The precipitated polymer is isolated from the supernatant solution and is reused by dissolving it in an aqueous base to yield a sizing solution.

31 Claims, No Drawings

PROCESS FOR RECOVERY AND REUSE OF TEXTILE SIZE

BACKGROUND OF THE INVENTION

1. Field of Invention

The present invention relates to a process of recovery and reuse of textile sizes. More particularly, it relates to the recovery of interpolymers of $C_4$ to $C_7$ vinyl esters and $\alpha, \beta$-unsaturated acids from woven goods and reuse of the interpolymers as a warp size.

2. Prior Art

In textile weaving, warp yarn is sized with an aqueous solution of a water soluble polymer and is then woven with the woof into cloth on a loom equipped with a mechanical shuttle or a water jet. The size forms on the surface of the warp yarn a coating or film which protects the yarn from abrasion and covers up warp defects such as knots, crossed ends, slubs and similar weak spots. The size must be abrasion resistant and adhere strongly to the yarn so that little shedding occurs during slashing and weaving of the yarn. When the yarn has been woven into cloth, the size is removed in a scouring bath containing an appropriate solvent for the size.

Preferred sizes are applied as aqueous solutions and are removed with water or aqueous solutions containing surfactants. Among the preferred sizes are interpolymers containing acid groups which provide solubility in aqueous solutions of bases such as alkali metal hydroxides and carbonates or ammonium hydroxide. Typical of such interpolymers are those acidic vinyl ester interpolymers disclosed in U.S. Pat. Nos. 3,723,381 and 3,759,858.

Traditionally, the textile industry has disposed of the dilute solutions of warp size formed in the scouring bath by dumping them into local sewage systems where their demand for chemical oxygen impairs the efficiency of effluent treatment, or into the lakes and streams where they may impose an intolerable biochemical oxygen demand on the life supporting medium of aquatic life. A need to avoid such pollution by removal of the textile size from wash solutions is not recognized.

The prior art teaches processes for recovery of acid interpolymers comprising ethylene and acrylic acid from the scouring solution by acidification of the solution to a pH in the range 4–6 to precipitate the polymer. While such polymers are readily recovered, they suffer from shortcomings which make their use as textile sizes undesirable. For example, they require a high acid content and an excess of strong base such as sodium hydroxide for solubility in aqueous media. Consequently, their solutions have a high pH, are hazardous to handle, and tend to break down wool fiber structure and to mercerize cotton yarns, both at the sizing and the desizing steps. Moreover, such sizes adhere poorly to yarns of polyester and polyester-cotton blends.

Textile sizes of acidic vinyl ester interpolymers generally adhere well to a broad spectrum of textile fibers and are effective sizes. However, recovery of such sizes by the processes of the prior art may be attended with hydrolysis of the vinyl ester groups, modifying the solution characteristics of the sizes and militating against the reuse of the sizes. Moreover, because of the hydrophilicity of the interpolymers in the acid form, precipitation of the size from the scouring solution tends to yield a gummy mass of interpolymer or an extremely finely divided interpolymer so that economic recovery becomes well nigh impossible. Thus, there exists a need in the art for a process of recovery of textile sizes of acidic vinyl ester interpolymers and a process of recovery and reuse of such interpolymers as textile sizes.

SUMMARY OF THE INVENTION

The need is supplied by the present invention which provides a process for recovery of a warp size from a woven cloth sized with an interpolymer or the alkali metal salt of an interpolymer of a vinyl ester and an $\alpha, \beta$-unsaturated acid which comprises:

A. desizing the cloth by contacting it with an aqueous solvent at a temperature of 45° to 100°C. to yield a desize liquor of pH less than 10, containing between 0.70 and 7.5 parts by weight of the interpolymer per 100 parts by weight of the desize liquor, B. adding alkali metal ion to the desize liquor to provide a total concentration of alkali metal ion between 125 and 600milliequivalents per 100 g. of interpolymer, C. adding an acid of $pK_a$ at least 4.8 and a water solubility of at least 20 parts by weight per hundred parts of water, to the desize liquor at a temperature in the range of 40°–90°C. to reduce the pH of the desize liquor to between 1 and 3, thereby precipitating the interpolymer, and D. isolating the precipitated interpolymer from the supernatant solution.

The recovered interpolymer may then be reused by dissolving it in a dilute solution of an alkali metal hydroxide or carbonate or ammonium hydroxide to form a sizing solution of pH in the range of 6 to 10 containing between 1 and 25 parts of polymer per 100 parts of solution and applying the solution to a textile warp yarn. The process of recovery and reuse may be repeated on a multiple basis.

The interpolymer comprises 90 to 97 parts by weight of $C_4$ to $C_7$ vinyl ester, 3 to 10 parts by weight of $\alpha, \beta$-unsaturated acid and, optionally, up to 15 parts of a plasticizing comonomer such as dimethyl maleate and diethyl maleate.

PREFERRED EMBODIMENTS

The sizes used in the present invention are interpolymers of $C_4$ to $C_7$ vinyl esters. Such vinyl esters include vinyl acetate, vinyl propionate, vinyl butyrate and vinyl isobutyrate. The preferred vinyl ester is vinyl acetate since it enhances the solubility in aqueous base of interpolymers containing a low level of acid comonomer. Hence, it is preferred that at least 50 weight percent of the vinyl ester is vinyl acetate. The interpolymers contain between 3 and 10 parts by weight of an $\alpha, \beta$-unsaturated acid copolymerized with between 90 and 97 parts by weight of vinyl ester. The $\alpha, \beta$-unsaturated acid is selected from the group consisting of acrylic acid, methacrylic acid, crotonic acid, isocrotonic acid, and the monoalkyl esters of maleic acid, fumaric acid, citraconic acid and itaconic acid in which the alkyl group contains from 1 to 4 carbon atoms, such as mono-methyl, -ethyl, -propyl, and -butyl maleates, fumarates, citraconates and itaconates.

In addition to the vinyl ester and the $\alpha, \beta$-unsaturated acid comonomer, the interpolymers may contain up to 15 parts by weight of a plasticizing comonomer per 100 parts by weight of vinyl ester and $\alpha, \beta$-unsaturated acid. Examples of plasticizing comonomers include alkyl acrylates and methacrylates and dialkyl maleates and fumarates in which the alkyl group contains 1 to 8 carbon atoms such as methyl acrylate, 2-ethylhexyl acrylate, methyl methacrylate, n-octyl methacrylate, dimethyl maleate, bis(2-ethylhexyl) maleate, dimethyl fumarate and di-n-octyl maleate. When the interpolymers are used to size yarn which is woven on a water-jet loom, the preferred plasticizing comonomers are dimethyl maleate and diethyl maleate.

The interpolymers may be prepared by conventional bulk, solution or emulsion polymerization techniques using free radical initiators. They should have sufficiently high molecular weight to provide adequate physical properties, particularly toughness and abrasion resistance without causing excessive viscosity in the sizing solution. Molecular weights which correspond to specific viscosities in the range from 1.2 to 12, measured on solutions of interpolymer in dimethyl sulfoxide in a concentration of 1 gram per 100 ml. of solution, are generally sufficient. To obtain specific viscosities in this range, the preferred method of polymerization is emulsion polymerization at a temperature of 40°–60°C. using a redox initiator and a surfactant comprising a phosphate ester of an alkylphenol-ethylene oxide in which the alkyl group contains 7 to 11 carbon atoms. The process is set forth in U.S. Pat. No. 3,759,858. The interpolymer may be recovered from the emulsion or latex and dissolved in aqueous base to provide the sizing solution. Alternatively, aqueous base may be added to the latex to obtain the sizing solution directly. Within the present teaching, the term "sizing solution" identifies the aqueous solution of interpolymer used to size textile yarn, and the term "desize liquor" identifies the aqueous solution of interpolymer obtained in the scouring bath by dissolving the size from the woven cloth into the scouring solution.

Suitable bases for aqueous sizing solutions of the interpolymer include the hydroxides, carbonates and bicarbonates of alkali metals such as lithium, sodium and potassium, hydroxides, lithium, sodium and potassium carbonates and lithium, sodium and potassium bicarbonates and nitrogenous bases such as ammonia, methylamine, dimethylamine, trimethylamine, ethylamine, diethylamine, triethylamine, morpholine, etc. A preferred base in the preparation of a loom finish size is ammonium hydroxide, and preferred bases in the preparation of removable warp yarn size are sodium hydroxide and carbonate. The sizing solutions generally contain between 1 and 25 parts by weight of interpolymer per 100 parts by weight of sizing solution.

Sizing solutions prepared from the latices by solution in aqueous ammonia, sodium hydroxide or sodium carbonate have Brookfield viscosities in the range of from 5 to 500 centipoises at 5 to 20 percent solids at a temperature of 87°C. allowing easy application and control of the amount of size added to the yarn. Viscosities determined at 25°C. on solutions containing 10 weight percent of interpolymer are used for comparison of the interpolymers. The pH of the sizing solution may be between 6 and 10. It is preferably above 7 for adequate solution of the interpolymer and below 9 to minimize hydrolysis of the interpolymer and adverse effects on the sensitive yarns such as wool and synthetic acetate.

The sizes may be applied to a wide variety of textile yarns including acetate filament, polyester filament, rayon filament, nylon filament and poly(acrylonitrile) filament, and the texturized yarns obtained by drawing and crimping these filaments; spun polyester, spun cotton, spun cotton, spun rayon, spun nylon, spun acetate, spun wool and spun blends of these fibers. For polyester monofilament and texturized polyester, interpolymers containing vinyl acetate and vinyl propionate, described in U.S. Pat. No. 3,759,858 are the preferred sizes, and for spun polyester and polyester blends, interpolymers of vinyl acetate containing 4.0 to 7.5 weight percent of acrylic acid and 0.5 to 2.0 weight percent of a $C_1$ to $C_8$ alkyl monoester of maleic, fumaric or citraconic acid are preferred. For yarns woven by water-jet loom, the vinyl acetate interpolymers discussed above, containing dimethyl or diethyl maleates are preferred.

The sizing solution containing the amount of interpolymer for the desired viscosity and add-on at temperatures in the range of 40° to 95°C. is applied to the selected yarn on a conventional slasher with drying cans at a temperature in the range of 80° to 120°C. The sizing yarn is then woven into cloth.

The size is recovered from the woven cloth by scouring the cloth with water or a dilute aqueous alkaline solution of an alkali metal hydroxide or carbonate. Preferred alkali metals are lithium, sodium and potassium since they are readily available and have relatively low equivalent weights. Especially preferred alkaline scouring solutions contain sodium hydroxide of sodium carbonate. The concentration of hydroxide or carbonate in the aqueous alkaline scouring solution is between 0.001 N and 0.1 N. Sufficient scouring solvent should be used to provide a desize liquor of pH in the range 6 to 10 after complete removal of the interpolymer size from the cloth, containing between 0.70 and 7.5 parts by weight of the interpolymer per 100 parts by weight of the desize liquor. The preferred concentration is between 1.5 and 4.5 parts of interpolymer per 100 parts of desize liquor. Complete removal of the size from the textile can be demonstrated by determination of the amount of size removed in successive scourings, by application of a dye which has affinity for the textile but not for the size, or by application of an iodine solution which stains the size but not the textile. The amount of base in the scouring solvent obviously must be adjusted for the interpolymer size in the free acid or in the alkali metal salt form. However, the presence of certain textile size additives such as lubricants and surfactants and the presence of certain substances which are found in natural fibers, such as the pectins in cotton and the lanolins of wool, may require additional base over the theoretical amount for solution of the interpolymer. Thus, the amount of base in the initial scouring solution may range from 0 when the interpolymer size is the alkali metal salt to as much as 400 milliequivalents per 100 parts by weight of interpolymer when the interpolymer size has been applied to the textile as the ammonium salt and has formed the free acid upon drying or when acidic components or acid forming components have been added to the size or are present in the yarn. Preferably, the amount of base is sufficient to provide a desize liquor of pH 7 to 9, so that an adequate rate of solution of the interpolymer is achieved without hydrolysis of the interpolymer.

Desizing is carried out at temperatures in the range of 45° to 100°C. for a time sufficient to remove the interpolymer size. The approximate temperature is selected for the particular textile which is being desized. Thus, sensitive textiles such as wool are desized at lower temperatures in the range of 45° to 60°C. with a scouring solvent which will yield a desize liquor of pH not more than 9.

Isolation or recovery of the interpolymer from the desize liquor is achieved by adding sufficient alkali metal ion to the desize liquor to provide a total concentration, including the alkali metal ion already present in the desize liquor from the size or the scouring solution of 125 to 600 milliequivalents per 100 g. of interpolymer, and preferably a concentration of 150 to 400 milliequivalents. Acid is then added to reduce the pH to the range of 1 to 3 and the interpolymer precipitates as discrete regular particles of diameter greater than 100 microns which settle rapidly and are easily isolated from the supernatant solution by filtration, decantation, or centrifugation. The ion concentration at the precipitation step is critical. If there is insufficient ion when the acid is added, incomplete precipitation as a lumpy, sticky, mass occurs and some and, in extreme cases, all of the polymer remains in suspension as a sticky emulsion and the polymer cannot be readily handled or filtered. If excessive ion is present, the precipitate is extremely fine in size and blocks the filter medium or it may even form a latex which cannot be retained by the filter.

The alkali metal ion added to the desize liquor is preferably lithium, sodium or potassium; sodium being especially preferred. The alkali metal ion is added as the hydroxide, the carbonate or the salt of an acid provided the salt is sufficiently soluble in the desize liquor to yield the required concentration of alkali metal ion and provided that the acid is sufficient water-soluble that it does not precipitate with the interpolymer when the pH is adjusted to the range of 1 to 3. Preferred alkali metal salts are chlorides, bromides, nitrates, sulfates, mono- and di-hydrogen phosphates, acetates, formates, propionates butyrates, and maleates. Especially preferred are the neutral chlorides, nitrates, and sulfates.

The acid which is added to the size liquor to reduce the pH to the range of 1 to 3 is an acid which has a water solubility of at least 20 parts by weight per 100 parts by weight of water and a $pK_a$ of at least 4.8. Preferred acids include hydrochloric acid, hydrobromic acid nitric acid, sulfuric acid, phosphoric acid, and the lower carboxylic acids which are sufficiently water soluble such as formic acid, acetic acid, propionic acid, butyric acid, and maleic acid. Especially preferred are the strong mineral acids such as hydrochloric acid, nitric acid and sulfuric acid to avoid buffer effects. The acid can be added in any convenient form, for example, as a liquid or in aqueous solution preferably in a concentration of at least 20 parts by weight per 100 parts by weight of water. During the addition, the interpolymer desize liquor is agitated sufficiently to disperse the acid uniformly in the desize liquor. In general, agitation should be at a sufficient rate to create an appreciable vortex of approximately 1/20 or more of the diameter of the vessel holding the liquor, but without causing excessive turbulence or splashing of the desize liquor. The temperature of the desize liquor is maintained at a temperature in the range of 40° to 90°C. during the addition of acid. The preferred range is 50° to 80°C. since below 50°C. the interpolymer tends to form an emulsion and above 80°C. the precipitate tends to gumminess.

After the interpolymer has been precipitated and filtered, the filter cake is washed with water to free it from salt solution. It can then be dried to a fine powder of high bulk density which can be rapidly dissolved in aqueous base as described hereinbefore to reform the sizing solution for reuse in the sizing of warp yarn. Alternatively, the wet filter cake can be dissolved in aqueous base without the drying step, to reform the sizing solution. The interpolymer size can be recycled at least five times without showing an appreciable change in sizing characteristics.

The following examples are set forth in illustration of the present invention and should not be construed as a limitation thereof. Unless otherwise indicated, all parts and percentages given are by weight. Weaving efficiency is a measure of efficiency of weaving of the sized warp yarn into a cloth or sheet construction. It is expressed as a percentage ratio of the number of yards woven in unit time versus the number of yards which would be woven if the loom had no stops in the unit of time.

EXAMPLE 1

An aqueous latex containing 35 weight percent of an interpolymer comprising 93.95 parts by weight of vinyl acetate, 5.25 parts by weight of acrylic acid and 0.80 parts by weight of monomethyl maleate is dissolved in aqueous ammonia to form a sizing solution containing 9.2 weight percent of interpolymer. The pH is 8.9 and the viscosity is 245 cps. at 25°C.

The sizing solution is applied at 80°C. to a spun polyester-cotton (50:50 blend) on a commercial nine-can slasher operating at 90 meters per minute with one dip of the yarn in the size solution and passage through nip rolls set at a pressure of 658 grams per centimeter. Drying can temperatures are 104/121/123/121/121/123/123/121/123°C. The size add-on is 12.9 weight percent. Foaming of the sizing solution is negligible and there is no skinning. There is no sticking to the slasher cans. The split is easy.

The sized warp yarn is entered into a DSL loom weaving at 186 picks per minute in a Batiste weave construction 127 centimeters wide with 3068 total ends. Weaving is performed at 68 percent humidity. First quality fabric is woven at high efficiency.

One part by weight of woven cloth is scoured with five parts by weight of an aqueous solution containing 0.25 weight percent of sodium hydroxide for two hours at 88°C. The desizing is essentially complete since no stain forms when an iodine solution is thereafter applied to the cloth. The desize liquor contains 1.68 percent solids and has a pH of 8.3 at 25°C. The desize liquor is stirred at a moderate rate and heated to 65°C. An aqueous solution of sulfuric acid containing 1 part by weight of acid to 2 parts of water is added to reduce the pH to 2.0. Interpolymer precipitates as discrete non-tacky particles which settle rapidly to leave a clear supernatant liquid. The interpolymer is filtered leaving behind salts and undesirable components extracted from the yarn.

The recovered interpolymer is dissolved in aqueous ammonia to form a sizing solution containing 9.6 percent solids. The pH and viscosity of the solution at 25°C. are 8.20 and 750 cps., respectively. The sizing solution is applied to the spun polyester cotton on a commercial nine-can slasher as described above. No foaming or skinning occur in the solution. There is no sticking to the slasher cans. The split is easy.

The sized warp yarn is woven into cloth as described above. First quality fabric is obtained at high weaving efficiency.

EXAMPLE 2

A ten percent solution of the interpolymer of Example 1 is prepared in aqueous ammonia. The solution is dried at 120°C. to form a film of interpolymer. Three parts by weight of the dried interpolymer is dissolved in 8 parts by weight of a 0.25 percent aqueous solution of sodium hydroxide. The pH of the interpolymer solution is reduced to 2.0 by addition of aqueous hydrochloric acid containing one part hydrogen chloride to 2 parts water, at 65°C. to completely precipitate the interpolymer as discrete particles which settle rapidly. The precipitate is filtered, washed with warm water, compressed to squeeze out excess water and redissolved in aqueous ammonia to form a ten percent solution. The interpolymer is subjected to five cycles of solution and precipitation. After each cycle, a sample is tested for physical properties.

Viscosity is measured on a Brookfield LVF Viscometer with the appropriate spindle run at the appropriate speed at 25°C.

Tensile strength and elongation are measured according to ASTM Method D-882-67 on films of interpolymer cast from aqueous solutions neutralized with sodium carbonate. The test specimens are conditioned for 24 hours at 65 and 80 percent relative humidity prior to testing.

Adhesion values are measured by determining the load required to break 2.54 × 1.27 cm. lap joints of polyester film adhered with a 50 micron layer of interpolymer.

Specific viscosity measurements are determined on solutions of interpolymer in dimethyl sulfoxide (1 g. per 100 ml.) at 25°C.

The data are presented in Table 1 and show little change in the properties of the interpolymer after repeated solution and precipitation. Infrared spectra of film samples of the interpolymer obtained on an infrared spectrophotometer "Model 457" manufactured by the Perkin-Elmer Corporation showed no change in structure throughout the five cycles.

TABLE I

PHYSICAL PROPERTIES OF RECOVERED INTERPOLYMER

|  | Solution-Precipitation Cycles | | | |
|---|---|---|---|---|
|  | 0 cycle | 1 cycle | 3 cycles | 5 cycles |
| Aqueous Solution Viscosity 10 weight percent, 25°C., cps. | 3500 | 4500 | 8300 | 8600 |
| Tensile Properties at 65% R.H. | | | | |
| Yield strength, kg cm$^{-2}$ | 298 | 145 | 327 | 237 |
| Ultimate strength, kg cm$^{-2}$ | 252 | 145 | 251 | 237 |
| Elongation at yield, % | 120 | 9 | 115 | 18 |
| Tensile Properties at 80% R.H. | | | | |
| Yield strength, kg cm$^{-2}$ | 102 | 162 | 82 | 112 |
| Ultimate strength, kg cm$^{-2}$ | 167 | 120 | 149 | 122 |
| Elongation at yield, % | 525 | 380 | 480 | 410 |
| Adhesion value at 80% R.H. | 20 | 8.3 | 13 | 17 |
| Specific viscosity | 3.24 | 3.30 | 3.42 | 3.31 |

EXAMPLE 3

The interpolymer of Example 1 is dissolved in the stoichiometric quantity of aqueous sodium carbonate to form a solution of pH 7.2 containing two weight percent of interpolymer. The solution is divided into six portions (A–F) to which different amounts of sodium chloride are added.

| Solution | Sodium Chloride, mg per g. of Interpolymer |
|---|---|
| A | 0 |
| B | 20 |
| C | 50 |
| D | 100 |
| E | 150 |
| F | 300 |

Samples of each of the size solutions are stirred at a moderate rate and are heated to temperatures in the range of 40° to 80°C. Dilute aqueous hydrochloric acid containing one part by weight of hydrogen chloride to two parts by weight of water is added to each sample to reduce the pH to the range of 2 to 3. The degree of precipitation judged by amount of precipitate and the clarity of the supernatant liquid, the form of the precipitate and the filterability of the precipitate judged by the speed of filtration and the degree of retention, are noted. The data are presented in Table 2. Optimum conditions are obtained when the sodium chloride concentration of the interpolymer solution is in the range of 50 to 150 mg. per gram of interpolymer, corresponding to a total sodium ion concentration of 150 to 326 milliequivalents per 100 g. of interpolymer, with the temperature of the interpolymer solution above 40°C.

TABLE 2

EFFECT OF SODIUM CHLORIDE ON PRECIPITATION OF INTERPOLYMER

| Solution | Temp. °C. | Degree of Precipitation | Form of Precipitate | Filterability of Precipitate |
|---|---|---|---|---|
| A | 40 | none | — | — |
| B | 40 | slight | fine particles | poor |
| C | 40 | incomplete | lumpy, irregular | poor |
| D | 40 | almost complete | lumpy, irregular | poor |
| E | 40 | complete | lumpy, hard irregular | good |
| F | — | — | — | — |
| A | 60 | none | — | — |
| B | 60 | slight | lumpy particles | poor |
| C | 60 | almost complete | regular particles | good |
| D | 60 | complete | small, regular particles | very good |
| E | 60 | complete | fine, regular particles | good |
| F | 60 | incomplete | lumpy | good |
| A | 80 | incomplete | lumpy, sticky mass | very poor |
| B | 80 | incomplete | gummy mass | poor |
| C | 80 | almost complete | large particles | good |
| D | 80 | complete | regular, uniform size | very good |
| E | 80 | complete | fine particles | good |
| F | 80 | complete | very fine particles | very poor |

From the foregoing, it should be obvious that many variations are possible in the practice of the present invention without departing from the spirit or scope thereof.

What is claimed is:

1. A process for recovery of a warp size from a woven cloth sized with an interpolymer or an alkali metal salt of an interpolymer of a vinyl ester and an α,β-unsaturated acid which comprises:

A. desizing the cloth by contacting it with an aqueous scouring solvent containing from 0 to 400 milliequivalents of an alkali metal hydroxide or carbonate per 100 parts by weight of interpolymer at a temperature of 45° to 100°C. to yield a desize liquor of pH in the range of 6 to 10, containing from 0.70 to 7.5 parts by weight of the interpolymer per 100 parts by weight of the desize liquor, B. adding alkali metal ion to the desize liquor to provide a total concentration from 125 to 600 milliequivalents per 100 g. of interpolymer, C. adding an acid of $pK_a$ at least 4.8 and a water solubility of at least 20 parts by weight per hundred parts of water, to the desize liquor at a temperature in the range of 40°–90°C. to reduce the pH of the desize liquor to from 1 to 3, thereby precipitating the interpolymer, and D. isolating the precipitated interpolymer from the supernatant solution, wherein the interpolymer comprises 90 to 97 parts by weight of a vinyl ester containing 4 to 7 carbon atoms and 3 to 10 parts by weight of an $\alpha,\beta$-unsaturated acid selected from the group consisting of acrylic acid, methacrylic acid, crotonic acid, isocrotonic acid, and the monoalkyl esters of maleic acid, fumaric acid, citraconic acid, and itaconic acid in which the alkyl group contains from 1 to 4 carbon atoms and the specific viscosity of the interpolymer is in the range from 1.2 to 12, determined in a dimethyl sulfoxide solution containing 1 gram of interpolymer per 100 ml of solution at 25°C.

2. The process of claim 1 wherein the vinyl ester is vinyl acetate.

3. The process of claim 1 wherein the interpolymer comprises between 93 to 96 parts by weight of a vinyl ester containing from 4 to 7 carbon atoms and between 4 and 7 parts by weight of the $\alpha,\beta$-unsaturated acid.

4. The process of claim 1 wherein the desize liquor contains between 1.5 and 4.5 parts by weight of size per 100 parts by weight of desize liquor and has a pH in the range of 7 to 9.

5. The process of claim 1 wherein the alkali metal salt of the interpolymer is selected from the group consisting of the lithium, sodium, and potassium salts.

6. The process of claim 1 wherein alkali metal salt of the interpolymer is the sodium salt.

7. The process of claim 1 wherein the aqueous solvent is water or an aqueous solution of an alkali metal hydroxide or carbonate of normality in the range of 0.001 to 0.1.

8. The process of claim 7 wherein the alkali metal is lithium, sodium or potassium.

9. The process of claim 7 wherein the alkali metal is sodium.

10. The process of claim 1 wherein the alkali metal ion of step (B) is provided by addition of lithium, sodium or potassium hydroxide, carbonate or water soluble salt of a water-soluble acid.

11. The process of claim 10 wherein the water soluble salt is a chloride, bromide, nitrate, sulfate, phosphate, acetate, formate, propionate, butyrate or maleate.

12. The process of claim 1 wherein the alkali metal ion concentration is in the range of 150 to 400 milliequivalents per 100 g. of interpolymer.

13. The process of claim 1 wherein the acid of step (C) is selected from the group consisting of hydrochloric acid, nitric acid, sulfuric acid, hydrobromic acid, phosphoric acid, acetic acid, propionic acid, butyric acid and maleic acid.

14. The process of claim 13 wherein the acid is a mineral acid selected from the group consisting of hydrochloric acid, nitric acid and sulfuric acid.

15. A process for recovery of a warp size from a woven cloth sized with an interpolymer or a sodium salt of an interpolymer containing from 90 to 97 parts by weight of a $C_4$ to $C_7$ vinyl ester and 3 to 10 parts by weight of an $\alpha,\beta$-unsaturated acid selected from the group consisting of acrylic acid, methacrylic acid, crotonic acid, isocrotonic acid, and the monoalkyl esters of maleic acid, fumaric acid, citraconic acid and itaconic acid in which the alkyl group contains from 1 to 4 carbon atoms, which comprises:

A. desizing the cloth with an aqueous scouring solution containing from 0 to 400 milliequivalents of sodium hydroxide or carbonate per 100 parts by weight of interpolymer at a temperature of 45° to 100°C. to yield a desize liquor of pH in the range of 7 to 9, containing from 0.70 to 7.5 parts by weight of the interpolymer per 100 parts by weight of the desize liquor, B. adding sodium hydroxide, sodium chloride, sodium nitrate or sodium sulfate to the desize liquor to provide a total sodium ion concentration from 150 to 400 milliequivalents per 100 g. of interpolymer, C. adding an aqueous solution of an acid selected from the group consisting of hydrochloric acid, nitric acid and sulfuric acid to the desize liquor at a temperature in the range of 50° to 80°C. to reduce the pH of the desize liquor to from 1 to 3, thereby precipitating the interpolymer, and D. isolating the precipitated interpolymer from the supernatant solution, wherein the specific viscosity of the interpolymer is in the range from 1.2 to 12, determined in a dimethylsulfoxide solution containing 1 gram of interpolymer per 100 ml of solution at 25°C.

16. A process for recovery and reuse of a warp size which comprises:

A. desizing a woven cloth sized with an interpolymer or an alkali metal salt of an interpolymer of a vinyl ester and an $\alpha,\beta$-unsaturated acid, by contacting the woven cloth with an aqueous scouring solvent containing from 0 to 400 milliequivalents of alkali metal hydroxide or carbonate per 100 parts by weight of interpolymer at a temperature of 45° to 100°C. to yield a desize liquor of pH less than 10, containing from 0.70 to 7.5 parts by weight of the interpolymer per 100 parts by weight of the desize liquor, B. adding alkali metal ion to the desize liquor to provide a total concentration from 125 to 600 milliequivalents per 100 g. of interpolymer, C. adding an acid of $pK_a$ at least 4.8 and a water solubility of at least 20 parts by weight per hundred parts of water, to the desize liquor at a temperature in the range of 40° to 90°C. to reduce the pH of the desize liquor to from 1 to 3, thereby precipitating the interpolymer, D. isolating the precipitated interpolymer from the supernatant solution, E. dissolving the isolated interpolymer in a dilute solution of an aqueous base selected from the group consisting of alkali metal hydroxides and carbonates and ammonium hydroxide to form a sizing solution of pH in the range 6 to 10 containing between 1 and 25 parts of polymer per 100 parts of solution; and F. applying the sizing solution to a textile warp yarn, wherein the interpolymer comprises 90 to 97 parts by weight of a vinyl ester containing 4 to 7 carbon atoms and 3 to 10 parts by weight of an α,β-unsaturated acid selected from the group consisting of acrylic acid, methacrylic acid, crotonic acid, isocrotonic acid, and the monoalkyl esters of maleic acid, fumaric acid, citraconic acid, and itaconic acid in which the alkyl group contains from 1 to 4 carbon atoms and the specific viscosity of the interpolymer is in the range from 1.2 to 12, determined in a dimethyl sulfoxide solution containing 1 gram of interpolymer per 100 ml of solution at 25°C.

17. The process of claim 16 wherein the vinyl ester is vinyl acetate.

18. The process of claim 16 wherein the interpolymer comprises between 93 to 96 parts by weight of a vinyl ester containing from 4 to 7 carbon atoms and between 4 and 7 parts by weight of the α,β-unsaturated acid.

19. The process of claim 16 wherein the desize liquor contains between 1.5 and 4.5 parts by weight of size per 100 parts by weight of desize liquor and has a pH in the range of 7 to 9.

20. The process of claim 16 wherein the alkali metal salt of the interpolymer is selected from the group consisting of the lithium, sodium, and potassium salts.

21. The process of claim 16 wherein the alkali metal salt of the interpolymer is the sodium salt.

22. The process of claim 16 wherein the aqueous solvent is water or an aqueous solution of an alkali metal hydroxide or carbonate of normality in the range of 0.001 to 0.1.

23. The process of claim 16 wherein the alkali metal is lithium, sodium or potassium.

24. The process of claim 23 wherein the alkali metal is sodium.

25. The process of claim 16 wherein the alkali metal ion of step (B) is provided by addition of lithium, sodium or potassium hydroxide, carbonate or water soluble salt of a water-soluble acid.

26. The process of claim 25 wherein the water soluble salt is chloride, bromide, nitrate, sulfate, phosphate, acetate, formate, propionate, butyrate or maleate.

27. The process of claim 16 wherein the alkali metal ion concentration is in the range of 150 to 400 milliequivalents per 100 g. of interpolymer.

28. The process of claim 16 wherein the acid of step (C) is selected from the group consisting of hydrochloric acid, nitric acid, sulfuric acidm hydrobromic acid, phosphoric acid, acetic acid, propionic acid, butyric acid and maleic acid.

29. The process of claim 14 wherein the acid is a mineral acid selected from the group consisting of hydrochloric acid, nitric acid and sulfuric acid.

30. The process of claim 16 wherein the textile warp yarn is selected from the group consisting of acetate filament, polyester filament, rayon filament, nylon filament and poly(acrylonitrile) filament and the texturized yarns obtained by drawing and crimping these filaments; spun polyester, spun cotton, spun rayon, spun nylon, spun acetate, spun wool and spun blends of these fibers.

31. A process for recovery and reuse of a warp size which comprises:

A. desizing a woven cloth sized with an interpolymer or an alkali metal salt of an interpolymer of a vinyl ester and an α,β-unsaturated acid, by contacting the woven cloth with an aqueous scouring solution containing from 0 to 400 milliequivalents of sodium hydroxide per 100 parts by weight of interpolymer at a temperature of 45° to 100°C. to yield a desize liquor of pH in the range 7 to 9, containing from 0.70 to 7.5 parts by weight of the interpolymer per 100 parts by weight of the desize liquor, B. adding sodium hydroxide, sodium chloride, sodium nitrate or sodium sulfate to the desize liquor to provide a total sodium ion concentration from 150 to 400 milliequivalents per 100 g. of interpolymer, C. adding an aqueous solution of an acid selected from the group consisting of hydrochloric acid, nitric acid and sulfuric acid to the desize liquor at a temperature in the range of 50° to 80°C. to reduce the pH of the size solution to from 1 to 3, thereby precipitating the interpolymer, D. isolating the precipitated interpolymer from the supernatant solution, E. dissolving the isolated interpolymer in a dilute solution of an aqueous base selected from the group consisting of alkali metal hydroxides and carbonates and ammonium hydroxide to form a sizing solution of pH in the range 7 to 9 containing from 1 to 25 parts of polymer per 100 parts of solution, and F. applying the sizing solution to a textile warp yarn, wherein the interpolymer comprises 90 to 97 parts by weight of a vinyl ester containing 4 to 7 carbon atoms and 3 to 10 parts by weight of an α,β-unsaturated acid selected from the group consisting of acrylic acid, methacrylic acid, crotonic acid, isocrotonic acid, and the monoalkyl esters of maleic acid, fumaric acid, citraconic acid, and itaconic acid in which the alkyl group contains from 1 to 4 carbon atoms and the specific viscosity of the interpolymer is in the range from 1.2 to 12, determined in a dimethyl sulfoxide solution containing 1 gram of interpolymer per 100 ml of solution a 25°C.

* * * * *

UNITED STATES PATENT OFFICE
CERTIFICATE OF CORRECTION

PATENT NO. : 3,960,485

DATED : June 1, 1976

INVENTOR(S) : Joel Fantl & Joseph G. Martins

It is certified that error appears in the above-identified patent and that said Letters Patent are hereby corrected as shown below:

Column 1, line 43 "not" should read --- now ---.

Column 11, Claim 26, line 2, add --- a --- after "is".

Column 12, Claim 29, line 1, "Claim 14" should read --- Claim 16 ---.

Signed and Sealed this

Tenth Day of August 1976

[SEAL]

Attest:

RUTH C. MASON
*Attesting Officer*

C. MARSHALL DANN
*Commissioner of Patents and Trademarks*